United States Patent [19]

Atwood et al.

[11] Patent Number: 5,378,133
[45] Date of Patent: Jan. 3, 1995

[54] DOUGH EXTRUDING FEEDER

[75] Inventors: Harold Atwood; Thomas A. Atwood, both of Dolton, Ill.

[73] Assignee: AM Manufacturing Company, Dolton, Ill.

[21] Appl. No.: 120,087

[22] Filed: Sep. 13, 1993

[51] Int. Cl.[6] .......................... A21C 3/04; A21C 11/16
[52] U.S. Cl. ..................................... 425/136; 425/141; 425/145; 425/183; 425/449; 425/461
[58] Field of Search ............... 425/141, 145, 183, 190, 425/382.3, 461, 447, 449, 238, 239, 240, 241, 136; 426/516, 517, 513

[56] References Cited

U.S. PATENT DOCUMENTS 4,276,317 6/1981 Hayashi .
4,398,877 8/1983 Taylor .
5,124,163 6/1992 Hayashi .

Primary Examiner—Khanh Nguyen
Attorney, Agent, or Firm—Hill, Steadman & Simpson

[57] ABSTRACT

A device for feeding dough is provided which has a hopper for receiving dough and directing the dough downwardly to a housing which contains a first rotatable member for engaging and urging the dough downwardly toward a pair of opposed second rotatable members. The second rotatable members have a gap therebetween to receive the dough therethrough and they rotate in opposite directions to urge the dough downwardly therebetween. Both the first and second rotatable members have a surface configuration which enhances engagement between the rollers and the dough. An orifice is provided in the housing below the second rotatable members for receiving the dough from the second rotatable rollers. The dough thus leaves the housing in the form of a continuous cylinder having a diameter of the same size as the orifice.

12 Claims, 3 Drawing Sheets

DOUGH EXTRUDING FEEDER

BACKGROUND OF THE INVENTION

The present invention relates to an apparatus for feeding dough.

Devices are known for taking a mass of dough such as that used to manufacture confectionery and bread, and to feed the mass of dough from a hopper between multiple pairs of rollers so as to stretch the web of dough or forming the dough mass into a strip as it is being fed from the hopper. For example, such devices are disclosed in U.S. Pat. Nos. 4,276,317 and 5,124,163. It is also known to use pairs of opposed rollers to modify the thickness of sheets of dough flowing through the rollers. Such an arrangement is disclosed in U.S. Pat. No. 4,398,877.

SUMMARY OF THE INVENTION

The present invention provides a dough feeding apparatus in which the dough is placed into a hopper which has downwardly and inwardly angled sidewalls, an open top for receiving the dough and an open bottom. A housing is positioned below the hopper and has a central passage in communication with the open bottom of the hopper. A first rotatable member is positioned in a first chamber of the central passage, at least partially below the open bottom of the housing so as to engage dough from the hopper and to carry the dough downwardly as the rotatable member rotates. This first chamber has at least one arcuate wall spaced from the first rotatable member to allow passage of the dough between the first rotatable member and the arcuate wall. A bottom opening leads from the first chamber to a second chamber.

A pair of opposed second rotatable members is located in the second chamber. The second rotatable members have a gap therebetween to receive dough therethrough. The second rotatable members are rotatable in counter clockwise directions to each other for urging the dough downwardly therebetween. The first and second rotatable members each have a surface configuration to enhance engagement and movement of the dough by the rotatable members. An orifice is provided in the housing positioned below the second rotatable members for receiving dough from the second rotatable members. With such a device, dough is urged out of the orifice by the second rotatable members in the form of a continuous cylinder having a diameter of the same size as the orifice The orifice can be formed in a removable plate such that the orifice size may be changed by changing the plate.

The rotatable members could have a ridged outer contour with ridges running parallel to an axis of rotation of the rotatable members. The first rotatable member might have at least one radially extending paddle formed on an outer contour with the paddle extending parallel to an axis of rotation of the first rotatable member so that it will more effectively engage and carry the dough mass downwardly toward the second rollers. The first rotatable member may also have a portion which extends up into the hopper to more effectively engage and carry dough downwardly toward the second rotatable members.

A second arcuate wall in the first chamber may be positioned in close proximity with an outer surface of the rotatable member at the bottom opening to prevent dough from being carried upwardly with continued rotation of the first rotatable member. Thus, all of the dough carried downwardly from the hopper will be dispensed through the bottom opening to the second rotatable members.

A roller may be positioned below the orifice to assist in redirecting the continuous cylinder of dough exiting from the orifice.

DETAILED DESCRIPTION OF THE PREFERRED EMBODIMENTS

Figure 1:
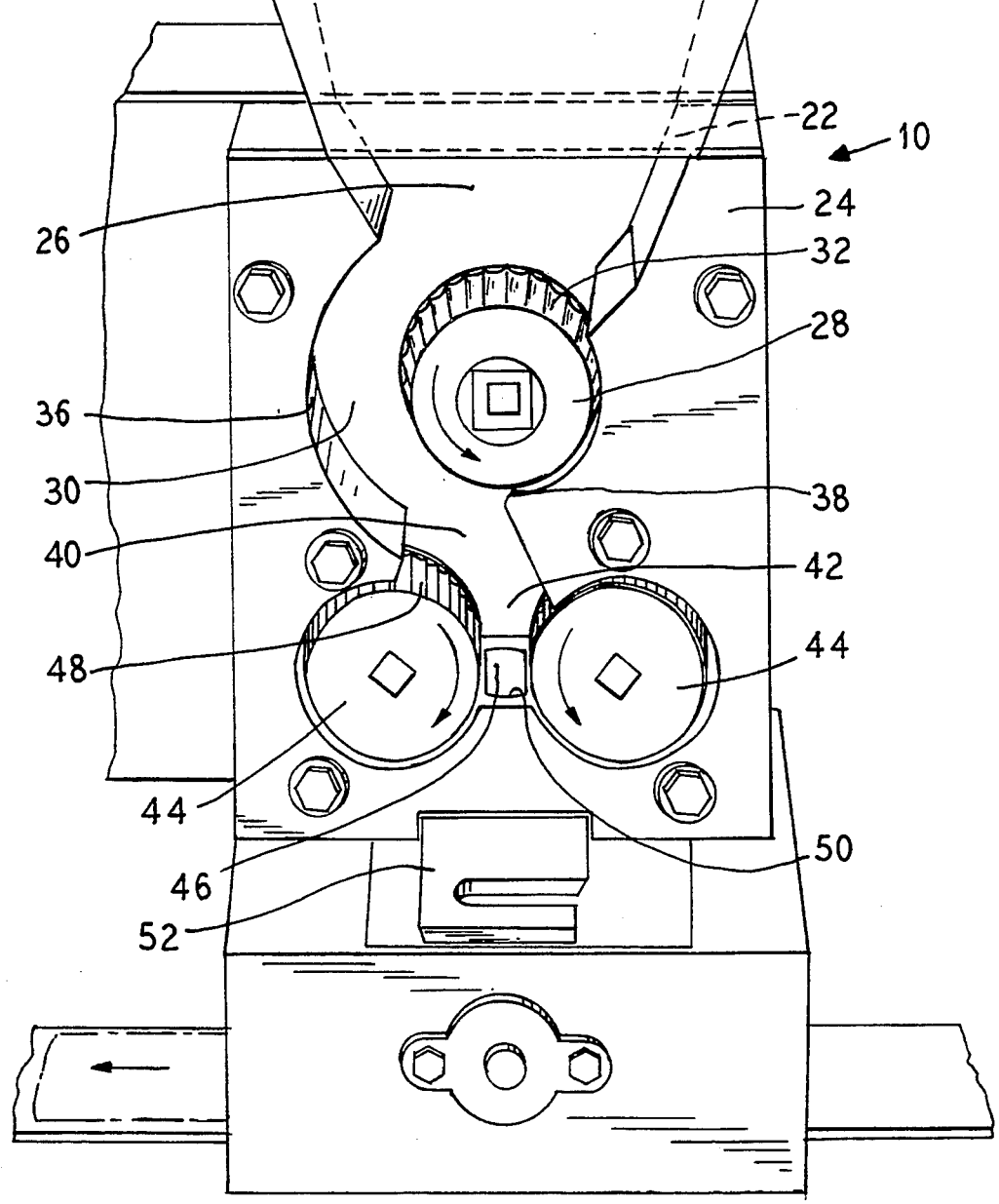
FIG. 1 is a front perspective view of an embodiment of the dough feeding device of the present invention.

In FIG. 1 there is illustrated a dough feeding device generally at 10 which includes a hopper 12 for receiving a supply of dough 14 in the form of a large mass. The hopper 12 has downwardly and inwardly angled sidewalls 16, 18 with an open top 20 for receiving the dough 14. The hopper also has an open bottom 22. A housing 24 is positioned below the hopper 12. The housing has a central passage 26 in communication with the open bottom 22 of the hopper 12.

A first rotatable member 28 is positioned within a first chamber 30 of the central passage 26. The first rotatable member 28, which may be in the form of a roller, is positioned completely below the open bottom 22 of the hopper. The rotatable member 28 has a ridged outer surface 32 which enhances engagement between the rotatable member 28 and the dough.

The first chamber has a first arcuate wall 36 which is spaced from the first rotatable member 28 to allow passage of the dough 14 between the first rotatable member and the arcuate wall. The rotatable member rotates in counter clockwise direction as shown in FIG. 1 and the ridged outer surface 32 enhances engagement of the dough as the dough is being carried through the first chamber. The first chamber has a second arcuate wall 38 on an opposite side of the rotatable member 28 from the first arcuate wall 36. The second arcuate wall 38 is positioned close to the rotatable member so as to prevent dough from continuing its movement with the rotatable member, thus preventing the dough from being carried upwardly back to the area of the hopper.

A space 40 between the first and second arcuate walls, just below the rotatable member 28, defines a bottom opening of the first chamber which leads to a second chamber 42. A pair of opposed second rotatable members 44 are located in the second chamber 42. The second rotatable members have a gap 46 therebetween to receive dough therethrough. The second rotatable members 44 are rotatable in counter directions to each other for urging the dough downwardly therebetween.

The second rotatable members 44 also have a surface configuration to enhance engagement of the dough by the rotatable members and may also have a ridged exterior surface 48 similar to that of the first rotatable member.

The housing has an orifice 50 positioned below the second rotatable members 44 for receiving dough from the second rotatable members. Thus, as the second rotatable members rotate, dough is urged through the orifice 50 in the form of a continuous cylinder having a diameter of the same size as the orifice. The dough can than be dropped or laid onto a moving horizontal conveyor belt 62 leading to a point of further processing.

In the embodiment of the invention shown in FIG. 1, the orifice 50 is formed in a removable plate 52 which can be slid out from beneath the second rotatable members 44 and replaced with a different plate having a differently sized orifice 50. Thus, the orifice size can be changed by changing the plate.

Figure 2:
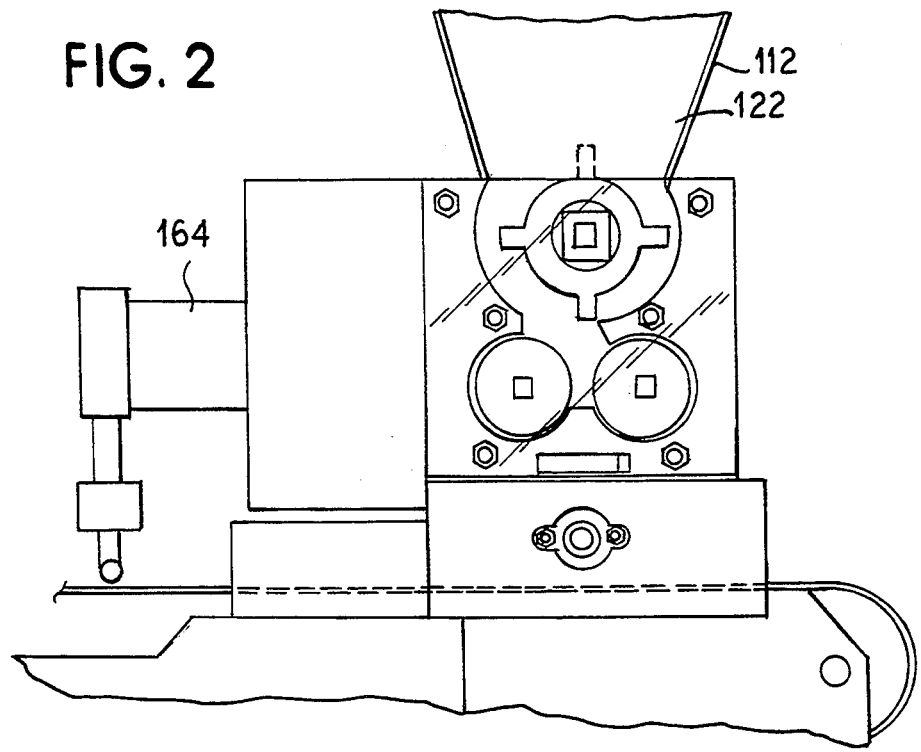
FIG. 2 is a front elevational view of a second embodiment of a dough feeding device of the present invention.
Figure 3:
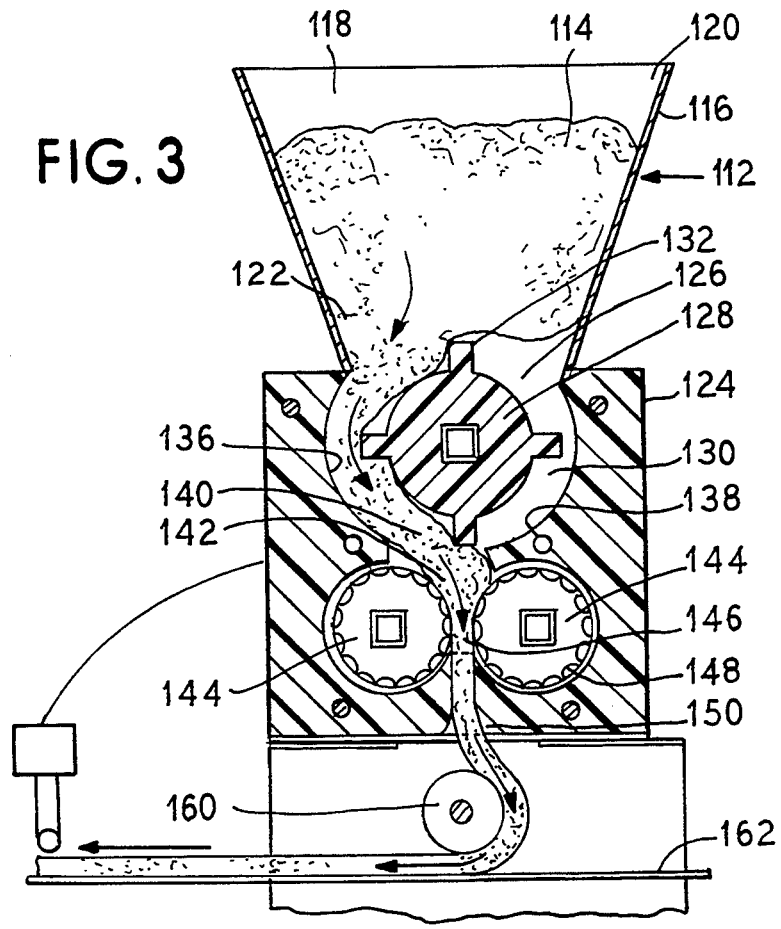
FIG. 3 is a sectional view of the device of FIG. 2.
Figure 4:
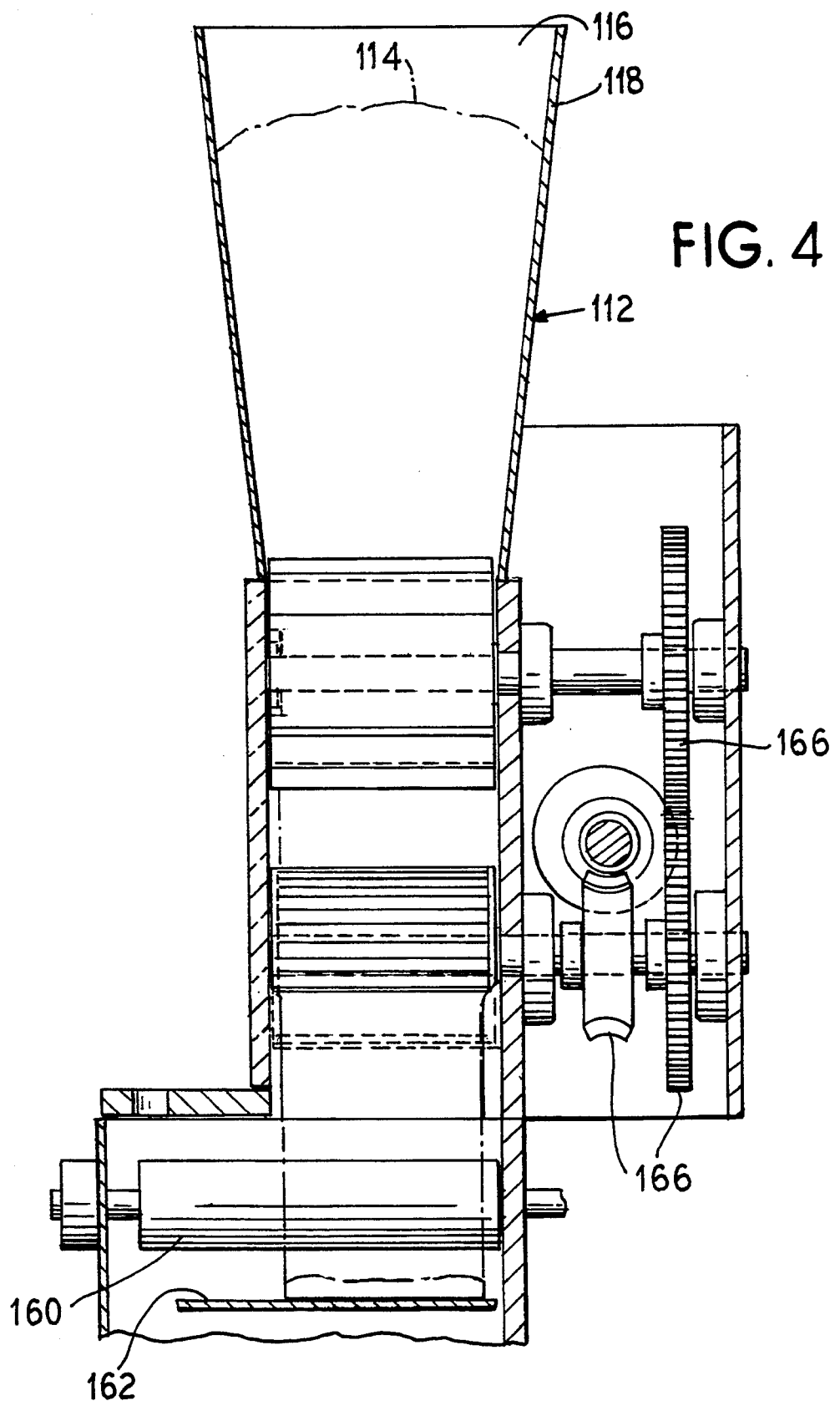
FIG. 4 is a side sectional view of the device of FIG. 2.

An alternate embodiment of the invention is shown in FIGS. 2–4. In this embodiment of the invention there again is provided a hopper 112 for receiving a supply of dough 114. The hopper 112 has downwardly and inwardly angled sidewalls 116, 118 with an open top 120 and an open bottom 122. A housing 124 is positioned below the hopper 112. The housing 124 has a central passage 126 in communication with the open bottom 122 of the hopper 112. A first rotatable member 128 is positioned in a first chamber 130 of the central passage 126.

In this embodiment, the first rotatable member 128 is only partially below the open bottom 122 of a hopper, and it partially extends up into the hopper 112 to engage dough 114 in the hopper and to carry the dough downwardly. The first chamber 130 has a first arcuate wall 136 spaced from the first rotatable member 128 to allow passage of the dough 114 between the first rotatable member and the arcuate wall. This first chamber 126 also has a second arcuate wall 138 which is positioned very close to an outer surface 132 of the first rotatable member. The outer surface 132 may be in the form of one or more paddles which project radially and extend parallel to an axis of rotation of the first rotatable member. Applicant has found that between two and five paddles provide the best working results although one or more than five paddles could be used. Preferably three or four equidistantly spaced paddles would be provided.

A space 140 between a lowermost portion of the first arcuate wall 136 and second arcuate wall 138 defines a bottom opening of the first chamber which leads to a second chamber 142. A pair of opposed second rotatable members 144 are positioned in the second chamber 142. The second rotatable members 144 have a gap 146 therebetween to receive the dough therethrough. The second rotatable members 144 are rotatable in counter directions to each other for urging the dough 114 downwardly therebetween.

The second rotatable members 144 may also have a surface configuration 148 to enhance engagement and movement of the dough by the rotatable members. Again this surface configuration may be in the form of ridges which extend parallel to an axis of rotation of the second rotatable members An orifice 146 is provided in the housing 124 positioned below the second rotatable members 144 for receiving dough from the second rotatable members. Again, the dough 114 is urged out of the orifice 146 in the form of a continuous cylinder having a diameter of the same size as the orifice 150. A free wheeling roller 160 may be provided below the orifice 150 to receive and guide the dough cylinder as the dough cylinder is laid on to a moving conveyor belt 162. The dough can then be carried onto a point of further processing in the form of cutting, rolling or forming.

As seen in FIG. 4, the first and second rotatable members 128, 144 may be driven by a single motor 164 through appropriate drive gears 166 as is known in the art.

As shown in FIG. 2, a sensor 170 may be provided along the conveyor belt 162 downstream of the roller 160 to detect an excess amount of dough on the conveyor belt. The sensor 170 is connected to a control 172 which is used to control energization of the motor 164. If too much dough is detected by the sensor 170, the control 172 will deenergize the motor 164 stopping the rotation of the first and second rotatable members 128, 144, but not the conveyor belt 162. When the excess dough has been cleared, the sensor 170 through the control 172 will permit the motor 164 to resume operation.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. A device for feeding dough comprising:
    a hopper having downwardly and inwardly angled side walls and an open bottom for receiving a supply of dough;
    a housing positioned below said hopper, said housing having a first space therein defined by two opposed arcuate side walls and a bottom opening leading to a second space;
    a first rotatable member positioned in said first space, at least partially below said open bottom of said hopper, to engage dough from said hopper and to carry said dough downwardly along a first of said arcuate side walls, said rotatable member having an outer surface with at least one paddle extending therefrom to enhance engagement and movement of said dough by said rotatable member, said paddle being spaced from said first side wall to permit passage of said dough between said first side wall and said paddle, said paddle being positioned closely adjacent to a second of said arcuate side walls to prevent dough from being carried by said rotatable member beyond said bottom opening;
    a pair of opposed second rotatable members located in said second space below said first rotatable member, said second members having a gap therebetween to receive dough therethrough, said second rotatable members being rotatable in counter directions to each other for urging said dough downwardly therebetween; said second rotatable members each having a surface configuration to enhance engagement and movement of said dough by said second rotatable members;
    an orifice positioned below said second rotating members for receiving dough from said second rotating members, wherein dough is urged out of said orifice by said second rotatable members in the form of a continuous cylinder having a diameter of the same size as said orifice; and a roller positioned below said orifice to redirect said dough cylinder exiting said orifice.

2. A device according to claim 1, wherein said orifice is formed in a removable plate, wherein said orifice size can be changed by changing said plate.

3. A device according to claim 1, wherein said second rotatable members have a ridged outer contour, with ridges running parallel to an axis of rotation of said second rotatable members.

4. A device according to claim 1, wherein said first rotatable member has a portion which extends up into said hopper.

5. A device according to claim 1, wherein said orifice is positioned above a conveyor belt such that dough exiting said orifice is carried away by said conveyor belt.

6. A device according to claim 5, wherein a sensor is provided along said conveyor belt to send a signal to a control to terminate operation of a motor rotating said rotatable members when said sensor detects an excess amount of dough downstream of said orifice.

7. A device for feeding dough comprising:
- a hopper for receiving a supply of dough having downwardly and inwardly angled side walls and an open top and bottom;
- a housing positioned below said hopper and having a central passage in communication with said open bottom, said central passage comprising a first chamber defined by two opposed arcuate side walls and a bottom opening and a second chamber below said bottom opening;
- a first rotatable member positioned in said first chamber of said central passage at least partially below said open bottom to engage dough from said hopper and to carry said dough downwardly along a first of said arcuate side walls, said rotatable member having an outer surface with at least one paddle extending therefrom to enhance engagement and movement of said dough by said rotatable member, said paddle being spaced from said first of said arcuate side walls of said first chamber to allow passage of said dough between said paddle of said first rotatable member and said arcuate wall;
- a pair of opposed second rotatable members located in said second chamber, said second rotatable members having a gap therebetween to receive dough therethrough, said second rotatable members being rotatable in counter directions to each other for urging said dough downwardly therebetween; said second rotatable members each having a surface configuration to enhance engagement and movement of said dough by said second rotatable members;
- an orifice in said housing positioned below said second rotatable members for receiving dough from said second rotatable members, wherein dough is urged out of said orifice by said second rotatable members in the form of a continuous cylinder having a diameter of the same size as said orifice; and
- a roller positioned below said orifice to redirect said dough cylinder exiting said orifice.

8. A device according to claim 7, wherein said orifice is formed in a removable plate, wherein said orifice size can be changed by changing said plate.

9. A device according to claim 7, wherein said second rotatable members have a ridged outer contour, with ridges running parallel to an axis of rotation of said second rotatable members.

10. A device according to claim 7, wherein said first rotatable member has a portion which extends up into said hopper.

11. A device according to claim 7, wherein said orifice is positioned above a conveyor belt such that dough exiting said orifice is carried away by said conveyor belt.

12. A device according to claim 11, wherein a sensor is provided along said conveyor belt to send a signal to a control to terminate operation of a motor rotating said rotatable members when said sensor detects an excess amount of dough downstream of said orifice.

* * * * *